Sept. 25, 1956   M. H. GRAHAM ET AL   2,763,978
PNEUMATIC COTTON PICKING UNIT
Filed July 3, 1953   4 Sheets-Sheet 3

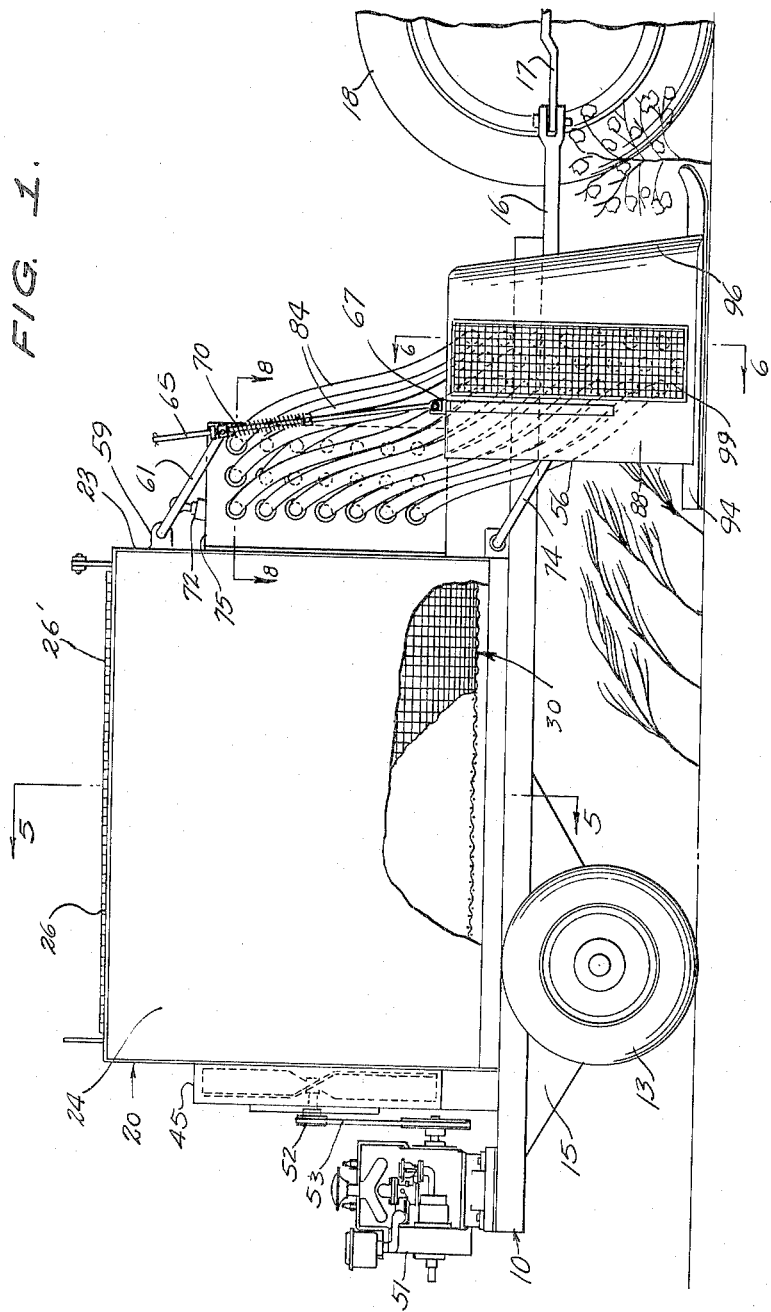

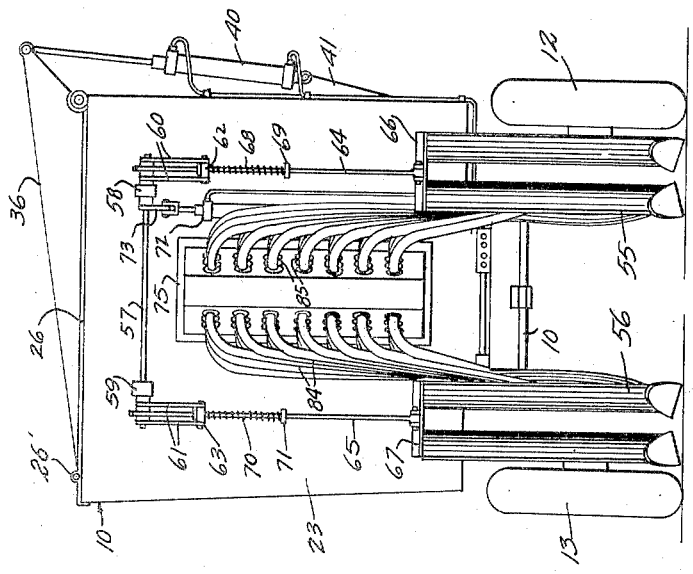

INVENTORS
MALCOLM H. GRAHAM,
WILLIAM C. GRAHAM, JR.
BY
McMorrow, Berman + Davidson
ATTORNEYS

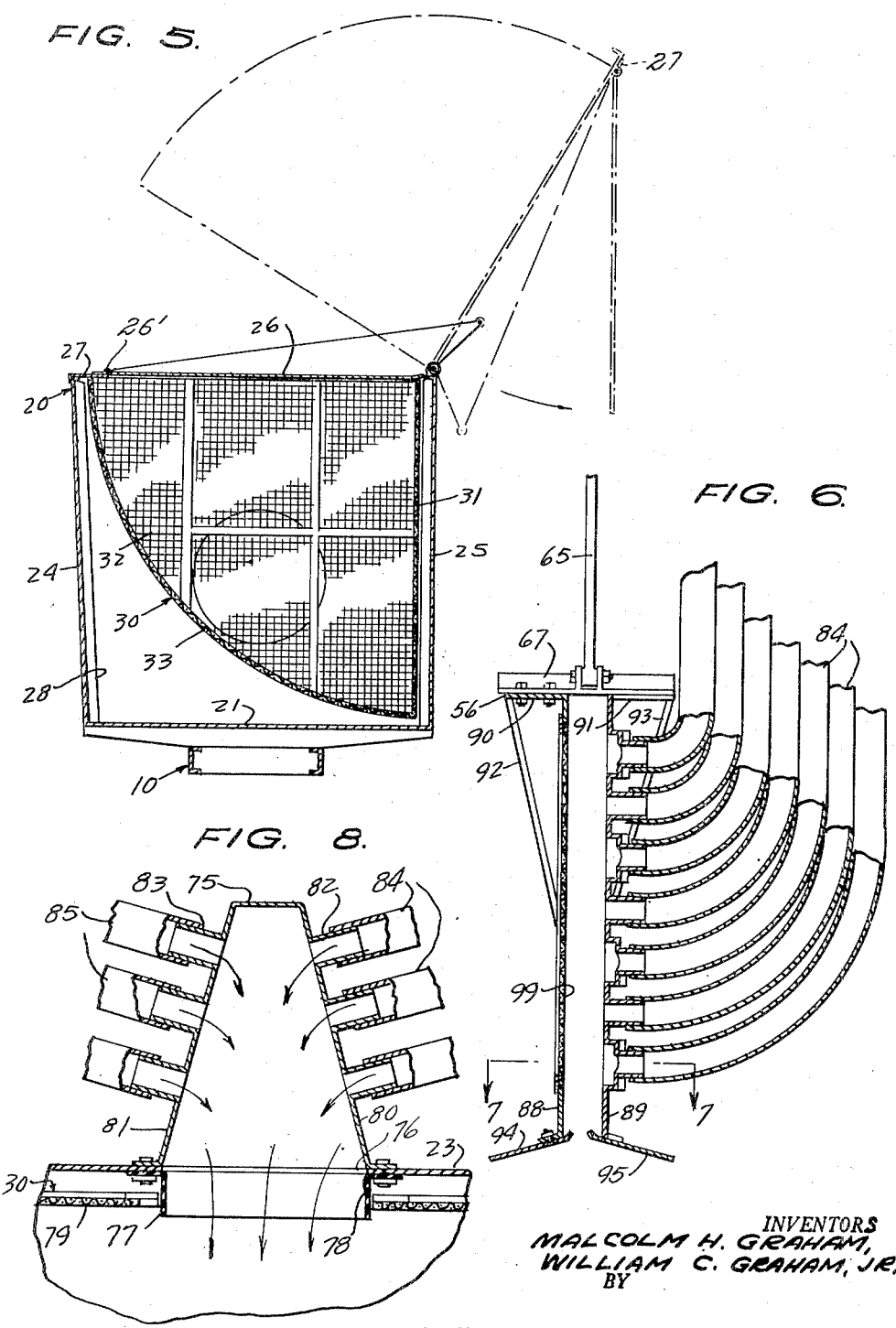

United States Patent Office 2,763,978
Patented Sept. 25, 1956

2,763,978

PNEUMATIC COTTON PICKING UNIT

Malcolm H. Graham and William C. Graham, Jr., Pamplico, S. C.

Application July 3, 1953, Serial No. 365,856

2 Claims. (Cl. 56—30)

This invention relates to cotton harvesting machines and more particularly to a vacuum type cotton harvester wherein the cotton bolls are pulled from the cotton plants by suction and deposited in a receptacle having air pervious walls.

It is among the objects of the invention to provide an improved cotton harvesting machine which is effective to harvest the cotton from two rows of cotton plants simultaneously, which removes the cotton from cotton plants by air suction and deposits the cotton in a receptacle or basket having air pervious walls, which has picking members in which the cotton plants are compressed in narrow spaces and a suction fan connected to the cotton-receiving receptacle at the end thereof remote from the end to which the picking members are connected so that none of the cotton passes through the fan; which has guard elements maintaining the cotton substantially free of dirt and debris; which is adapted to be tractor towed and may be driven from the power take-off connection of the associated tractor or may have its own power plant; and which is simple and durable in construction, economical to manufacture and operate, and effective and efficient in operation.

Other objects and advantages will become apparent from a consideration of the following description and the appended claims in conjunction with the accompanying drawings, wherein:

Figure 1 is a side elevational view of a cotton harvesting machine illustrative of the invention with a portion broken away to better illustrate the construction of the machine;

Figure 2 is a rear end elevation of the machine illustrated in Figure 1;

Figure 3 is a front end elevational view of the machine;

Figure 5 is a cross sectional view on the line 5—5 of Figure 1;

Figure 6 is a cross sectional view on an enlarged scale on the line 6—6 of Figure 1;

Figure 8 is a fragmentary cross sectional view on an enlarged scale on the line 8—8 of Figure 1.

Figure 4:
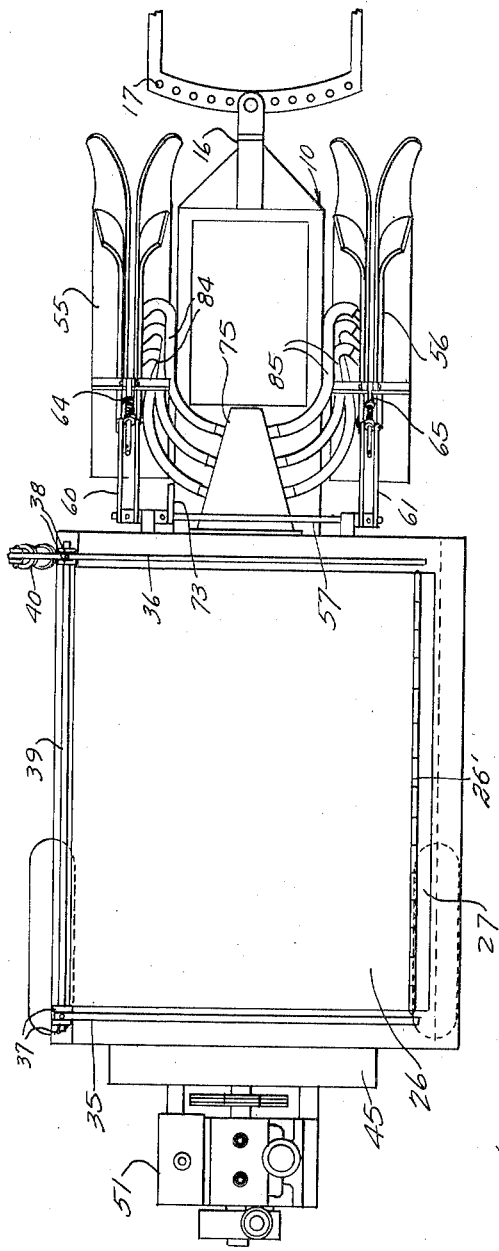
Figure 4 is a top plan view of the machine.

With continued reference to the drawings, the cotton harvesting machine comprises a frame 10 of elongated, rectangular shape, mounted near its rear end on a pair of rear wheels 12 and 13 disposed one at each side of the frame and journaled on the lower ends of legs or brackets 14 and 15 depending from the frame at the respectively opposite sides thereof. A tongue 16 is connected to the frame 10 medially of the width and at the front end of the frame and extends forwardly of the frame for connection to the draw bar 17 of an agricultural tractor 18.

A housing, generally indicated at 20, of rectangular shape is mounted on the frame 10 and has a bottom wall 21, a rear end wall 22, a front end wall 23, side walls 24 and 25 and a frame 27 extending over and resting upon the end walls 22 and 23 and side walls 24 and 25. The frame 27 is hingedly connected by the battens 35 and 36 to the side wall 25, as clearly shown in Figures 4 and 5. Extending over the frame 27 is a top wall 26 which is hingedly connected to the side of the frame 27 adjacent the side wall 24, as indicated by the numeral 26', Figures 4 and 5. It is to be noted that the portion of the frame 27 adjacent the side wall 24 rests upon the side wall 24 and the portions adjacent the rear and front walls 22 and 23 rest upon said walls 22 and 23. The walls of the housing 20 are formed of air impervious material, such as sheet or plate metal, and the housing is reinforced by internal frame work, as indicated at 28.

A receptacle, generally indicated at 30, of sector shaped cross section is disposed in the housing 20 and has a rectangular side wall 31 normally disposed in spaced and substantially parallel relationship to the side wall 25 of the housing, sector shaped end walls, such as the rear end wall 32 and a bottom wall 33 of partly cylindrical shape extending from a location adjacent the bottom edge of the side wall 25 of the housing to a location adjacent the top edge of the housing side wall 24. The battens 35 and 36 extend tranversely across the top of the frame 27, and are hingedly connected to the side wall 25 of the housing 20 by a hinge connection embodying a hinge pin 39 supported in the lugs 37 and 38 carried by the side wall 25. The batten 36 extends outwardly and upwardly from the hinge connection and a hydraulic expansible chamber device 40 is connected between the outwardly projecting end of the batten 36 and a bracket 41 mounted on the side wall 25 of the housing below the top of the housing. This expansible chamber hydraulic device is in the form of a cylinder and piston device of well known construction and is effective to swing the receptacle 30 upwardly and outwardly of the housing from the position shown in full lines in Figure 5 to the position shown in broken lines in this figure to dump cotton from the receptacle into the body of a truck or wagon positioned to receive the cotton, the receptacle forcing the top wall 26 of the housing upwardly as it is swung upwardly and outwardly from the housing by the hydraulic mechanism.

The rear wall 22 of the housing is provided with a centrally located opening 44 of circular shape and a flat ring 45 of cylindrical shape is secured at one end to the housing rear wall 22 exteriorly of this rear wall and concentrically of the opening 44 and it carries at its center suitable bearings supported by spokes 46 extending radially inwardly from the ring and in which a fan shaft 47 is journaled. A suction fan 50 is mounted on the shaft 47 and rotates within the cylindrical ring 45, an engine 51 being mounted on the rear portion of the frame 10 and drivingly connected to the fan shaft 47 through drive means including a belt pulley 52 mounted on the fan shaft and a belt 53 drivingly connecting the engine carried belt pulley to the belt pulley 52. When the fan 50 is in operation with the receptacle 30 disposed in the housing and the top wall or cover 26 of the housing closed, the fan creates a strong suction through the housing and through the receptacle 30.

A pair of cotton picking members 55 and 56 are disposed at respectively opposite sides of the frame 10 of the machine forwardly of the front wall 23 of the housing 10 and are suspended from the housing by lift mechanism including a horizontally disposed shaft 57 extending across the front wall 23 of the housing near the upper edge of the front wall and journaled near its opposite ends in bearing brackets 58 and 59 projecting outwardly of the front wall of the housing, double lever arms 60 and 61 projecting perpendicularly from the shaft 57 at the outer sides of the bearing brackets 58 and 59 respectively and carrying apertured blocks 62 and 63 pivotally mounted in these double lever arms at the ends thereof remote from the shaft 57. Links 64 and 65 are pivotally connected at their lower ends to the top wall structures 66 and 67 of the picking members 55 and 56 and extend upwardly from the picking members and slidably through the blocks 62 and 63 respectively, these links being provided on their upper ends with heads which bear against the upper sides of the slide blocks so that when the lever arms 60 and 61 are swung upwardly tension will be applied to the links 64 and 65 to lift the picking members 55 and 56 and when the lever arms are swung downwardly the picking members will be lowered. A compression spring 68 surrounds the link 64 between the slide block 62 and a spring abutment 69 mounted on the link below the slide block and a similar compression spring 70 surrounds the link 65 between the slide block 63 and a spring abutment 71 mounted on the link 65 below the slide block 63. The compression springs 68 and 70 resiliently force the picking members 55 and 56 downwardly and the bottom ends of these picking members against the ground when the lever arms 60 and 61 are swung downwardly to their limiting downward position, as illustrated in Figure 3.

A hydraulic expansible chamber device 72 is disposed substantially below the bearing bracket 58 and connected at its lower end to the front wall 23 of the housing by a connecting bracket, not illustrated. At its upper end this expansible chamber device is connected to the outer end of a lever arm 73 secured to and projecting outwardly from the shaft 57 and is effective to impart rotational movements to the shaft 57 to swing the double lever arms 60 and 61 upwardly and downwardly and to raise and lower the picking members 55 and 56. Crank arms, as indicated at 74 are pivotally connected one between each picking member and the housing 20 to hold the picking members in position relative to the frame and housing while providing freedom of vertical movement of the picking members.

A hollow, elongated, vertically disposed extension 75 of substantially triangular cross sectional shape is disposed against the outer surface of and projects forwardly from the front wall 23 of the housing 10, said extension being peripherally and sealably secured to the housing front wall. This extension communicates with the interior of the housing through its open rear end and an opening 76 in the front wall 23 of the housing and with the interior of the receptacle 30 through a sleeve 77 of resiliently flexible material, such as rubber, extending rearwardly from the front wall 23 in surrounding relationship to the opening 76 through an opening 78 in the front wall 79 of the receptacle.

The side walls 80 and 81 of the extension 75 are provided with a number of substantially equally spaced apart apertures and tubular nipples, as indicated at 82 and 83, extend perpendicularly outwardly from the side walls 80 and 81 of the extension with each nipple secured at one end to the corresponding side wall in surrounding relationship to an aperture in the side wall of the extension. Flexible conduits, as indicated at 84, are secured at corresponding ends each to one of the nipples 82 and similar flexible conduits, as indicated at 85, are secured at corresponding ends one to each of the nipples 83, so that the conduits 84 and 85 are in communication with the interior of the housing 10 through the interior of the housing extension 25.

Figure 7:
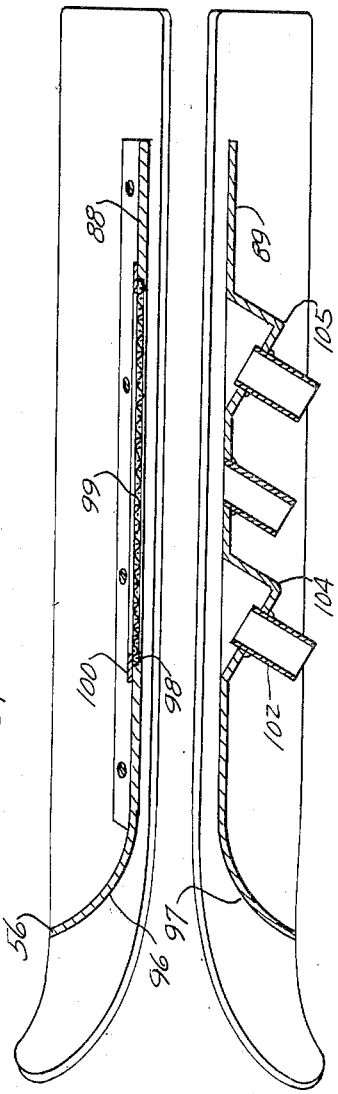
Figure 7 is a cross sectional view of the device on the line 7—7 of Figure 6.

The two cotton picking members or devices 55 and 56 are identical in construction except that one is right-hand and the other is left-hand and the right-hand member 56 has been selected for detail illustration in Figures 6 and 7 and for detail description in connection with these figures.

The member 56 comprises a pair of flat plates 88, 89 vertically disposed in spaced apart and substantially parallel relationship to each other and extending longitudinally of the frame 10 of the machine. The top structure 67 extends across and is secured to the plates 88 and 89 at the top edges of these plates, the plates being outwardly flanged, as indicated at 90 and 91 at their top edges and the top structure extending outwardly of the plates and secured to these flanges. Diagonal braces, as indicated at 92 and 93, extend from the outer ends of the top structure downwardly and inwardly to the plates 88 and 89 respectively intermediate the height of these plates and reinforce the top structure in maintaining the plates in their spaced apart and substantially parallel relationship to each other.

The plates 88 and 89 are outwardly flanged along their bottom edges and dirt shields 94 and 95 extend along the bottom edges of the plates 88 and 89 respectively and are rigidly secured to the plates by the outwardly extending bottom flanges thereon. The shields 94 and 95 are skid or ski-shaped, being curved upwardly and rounded off at their front ends and are transversely inclined so that each guard is inclined upwardly and inwardly toward the inner end of the opposite guard. The inner edges of the two guards are spaced apart a distance less than the distance between the plates 88 and 89 and such as to permit the base ends of cotton plants to pass between the inner edges of the guards or shields but to substantially preclude dirt from being drawn by suction into the space between the plates 88 and 89.

The plates 88 and 89 are outwardly curved at their forward edges, as indicated at 96 and 97 to facilitate the entry of cotton plants standing in a row of plants into the space between the plates and the plates are spaced apart a distance such that the plants are compressed between the two plates. The outer plate 88 is provided with a rectangular opening 98 which extends substantially from the bottom edge to the top edge of this plate and a distance longitudinally of the plate of at least one-third of the length thereof, and this opening is covered by a screen 99 of a suitable material, such as wire hardware cloth, secured to the plate by a frame 100 extending marginally around the opening 98.

The plate 89 is provided with a plurality of spaced apart apertures equal in number to the apertures in the adjacent side of the front housing extension 75 and nipples, as indicated at 102, are secured at corresponding ends one in each of the apertures in the plate 89. These nipples 102 are so positioned that their center lines are inclined outwardly and forwardly of the plate 89 at an angle of from twenty to thirty degrees to the plane of the pipe and the ends of the flexible conduits 84 remote from the nipples 82 on the extension side plate 80 are secured respectively to the nipples 102 to connect the space between the plates 88 and 89 with the suction created in the housing 10 by the suction fan 50.

The plate 89 is bent or recessed outwardly, as indicated at 104 and 105 in Figure 7, at each alternate aperture therein so that the portion of the plate immediately surrounding the corresponding aperture is disposed substantially perpendicular to the center line of the associated nipple. These recesses in the inner side of the plate 89 assist in the compression of the cotton plants between the inner and outer plates 89 and 88 and also provide a shaking or vibrating action which brings all of the cotton bolls on the plants into alignment with the apertures in the plate 89 as the plants pass through the space between the plates 88 and 89 and all of the cotton on the plants will be drawn by the air suction into the nipples 102 and will pass from these nipples to the corresponding flexible conduit and the housing extension 75 into the receptacle 30.

The two picking members are constructed alike and operate in the same manner to remove the cotton from the cotton plants passing therethrough, the cotton removed from the plants by both of these picking members being drawn through the corresponding flexible conduits into the receptacle 30 disposed within the housing 10. Whenever the receptacle is filled it is moved out of the housing and its contents dumped into an auxiliary vehicle in the manner described above.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Pneumatic cotton picking apparatus comprising: a pair of generally flat plates spaced closely apart in approximately vertical positions transversely of one another to form therebetween a narrow passage within which a cotton plant can be compressed by and between the plates on movement of the plates along a row of said plants; means at the lower ends of the plates supporting the same for movement along the ground, one plate having a vertically elongated, screen-covered air inlet opening of substantial size extending substantially from the lower to the upper end thereof, through which opening air may be drawn into the space between the plates, the other plate having portions thereof recessed in a direction vertically of said passage, and being formed with a plurality of air outlet openings each smaller than the air inlet opening, through which outlet openings air may be drawn out of said space, some of said air outlet openings being formed in the recessed portions, said air outlet openings being spaced closely apart over an area of said other plate corresponding substantially in size and location to, and aligned transversely of the plate with, said air inlet opening; and suction hoses connected to said other plate and communicating with said space through the outlet openings, thus to, in response to the creation of suction in said hoses, draw air through the air inlet opening to said space for passage of the air transversely of the space through plants confined between the plates, whereby to blow cotton bolls off said plants and effect passage of the air and the removed bolls through said outlet openings into the hoses.

2. Pneumatic cotton picking apparatus comprising: a pair of generally flat plates spaced closely apart in approximately vertical positions transversely of one another to form therebetween a narrow passage within which a cotton plant can be compressed by and between the plates on movement of the plates along a row of said plants; means at the lower ends of the plates supporting the same for movement along the ground, one plate having a vertically elongated, screen-covered air inlet opening of substantial size extending substantially from the lower to the upper end thereof, through which opening air may be drawn into the space between the plates, the other plate having vertically elongated, spaced portions recessed in a direction outwardly of said passage, said other plate being formed with vertical, horizontally spaced rows of air outlet openings, each recessed portion having a row of the air outlet openings extending therein, other air outlet openings being arranged between the recessed portions, said air outlet openings being spaced closely apart over an area of said other plate corresponding substantially in size and location to, and aligned transversely of the plate with, said air inlet openings; and suction hoses connected to said other plate and communicating with said space through the outlet openings, thus to, in response to the creation of suction in said hoses, draw air through the air inlet openings to said space for passage of the air transversely of the space through plants confined between the plates, whereby to blow cotton bolls off said plants and effect passage of the air and the removed bolls through said outlet into the hoses.

References Cited in the file of this patent
UNITED STATES PATENTS

| Number | Name | Date |
|---|---|---|
| 767,058 | Harvin | Aug. 9, 1904 |
| 830,102 | Richmond | Sept. 4, 1906 |
| 1,052,361 | Merritt | Feb. 4, 1913 |
| 1,723,151 | Goodwin | Aug. 6, 1929 |
| 1,985,373 | Johnston | Dec. 25, 1934 |
| 2,401,152 | Hagen | May 28, 1946 |
| 2,419,353 | Henley | Apr. 22, 1947 |
| 2,558,951 | Hagen et al. | July 3, 1951 |